US012294769B2

(12) United States Patent
Redmann et al.

(10) Patent No.: US 12,294,769 B2
(45) Date of Patent: May 6, 2025

(54) SYSTEM, APPARATUS AND METHODS PROVIDING A USER INTERFACE

(71) Applicant: InterDigital Madison Patent Holdings, SAS, Paris (FR)

(72) Inventors: William Redmann, Glendale, CA (US); Alan Stein, Princeton Junction, NJ (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 17/925,757

(22) PCT Filed: Jun. 16, 2021

(86) PCT No.: PCT/US2021/037646
§ 371 (c)(1),
(2) Date: Nov. 16, 2022

(87) PCT Pub. No.: WO2021/257714
PCT Pub. Date: Dec. 23, 2021

(65) Prior Publication Data
US 2023/0179833 A1   Jun. 8, 2023

Related U.S. Application Data

(60) Provisional application No. 63/040,351, filed on Jun. 17, 2020.

(51) Int. Cl.
*H04N 21/482* (2011.01)
*H04N 21/438* (2011.01)
*H04N 21/45* (2011.01)

(52) U.S. Cl.
CPC ..... *H04N 21/4826* (2013.01); *H04N 21/4384* (2013.01); *H04N 21/4532* (2013.01)

(58) Field of Classification Search
CPC .......... H04N 21/4826; H04N 21/4384; H04N 21/4532
See application file for complete search history.

(56) References Cited

U.S. PATENT DOCUMENTS 11,284,162 B1 * 3/2022 Gupta .................. H04N 21/235
2012/0266198 A1 * 10/2012 Kanojia ............... H04N 21/231
725/62

(Continued)

FOREIGN PATENT DOCUMENTS

EP   2750398 A1   7/2014
EP   2934016 A1   10/2015

OTHER PUBLICATIONS

Azgin Aytac et al. "Dynamic Channel Reordering To Reduce Latency During Surfing Periods in IPTV Networks", IEEE Transactions On Broadcasting, IEE Service Center, Piscataway, NJ, US, vol. 59, No. 3, Sep. 1, 2013, pp. 471-483.

(Continued)

*Primary Examiner* — Mulugeta Mengesha
(74) *Attorney, Agent, or Firm* — Condo Roccia Koptiw LLP

(57) ABSTRACT

Apparatus, methods and systems associated with electronic devices can involve determining a plurality of available services providing content, wherein each service has an associated content format; determining an order of the plurality of available services, based on the content format of each service and a sequence of switching between the plurality of available services, to reduce a transition time when switching, based on the sequence, from a first one of the plurality of available services to a second one of the plurality of services different from the first one; generating, based on the order, a list of the plurality of available services representing a program guide, wherein the first and second (Continued)

services are adjacent in the program guide; and enabling, based on the program guide, switching from the first service to the second service.

20 Claims, 6 Drawing Sheets

(56) References Cited

U.S. PATENT DOCUMENTS

2014/0189736 A1* 7/2014 Kummer .............. H04N 21/434
    725/39
2015/0304706 A1* 10/2015 Mun ................... H04N 21/4826
    725/39

OTHER PUBLICATIONS

Ramos Fernando, "Mitigating IPTV Zapping Delay", IEEE Communications Magazine, IEEE Service Center, Piscataway, US vol. 51, No. 8, Aug. 1, 2013, pp. 130-132.

ATSC, "ATSC Standard: Service Announcement Doc. A/332:2017", Advanced Television Systems Committee, Washington, DC, Dec. 6, 2017, 34 pages.

CTA, "Updates to Dynamic HDR Metadata Signaling", CTA-861.4, CTA Standard, Consumer Technology Association 2019, Technology & Standards Department, Mar. 2019, 37 pages.

CTA, "Users of CTA-861, a DTV Profile for Uncompressed High-Speed Digital Interfaces", Consumer Technology Association, CTA-861-G, CTA Technology & Standards Department, Nov. 2, 2017, 218 pages.

ITU-R, "Image Parameter Values for High Dynamic Range Television for Use in Production and International Programme Exchange", Recommendation ITU-R BT.2100-0, BT Series, Broadcasting Service (Television), Jul. 2016, 17 pages.

ITU-R, "ITU-R BT.709-5—Parameter Values for the HDTV Standards for Production and International Programme Exchange", International Telecommunications Union Radiocommunications Sector, Apr. 2002, pp. 1-32.

ITU-R, "Parameter Values for Ultra-high Definition Television Systems For Production And International Programme Exchange", Recommendation ITU-R BT.2020-1, BT Series Broadcasting service (television), Jun. 2014, 8 pages.

* cited by examiner

|  | 350 | 351 | 352 | 353 |
|---|---|---|---|---|
| 330— 302— | favorites | NatGeo | HDR | HD |
| 331— | recommended | Al Jazeera News | SDR | HD |
| 303— | favorites | SyFy Channel | SDR | HD |
| 304— | not recommended | lll | SDR | SD |
| 305— | favorites | Sci-Fi Movies Channel | HDR | HD |
| 306— | recommended | Meteor | SDR | SD |
| 307— | recommended | China News Network | SDR | HD |
|  | not recommended | bbb | SDR | SD |
| 308— | not recommended | kkk | SDR | SD |
|  | favorites | TCM | SDR | HD |
| 309— | favorites | Starz | SDR | HD |
|  | not recommended | mmm | SDR | SD |
| 310— | not recommended | eee | SDR | SD |
|  | not recommended | nnn | SDR | HD |
| 311— | not recommended | ooo | SDR | HD |
| 312— | not recommended | History Channel | HDR | HD |
|  | not recommended | ddd | SDR | SD |
|  | not recommended | hhh | SDR | SD |
| 313— | not recommended | ggg | SDR | SD |
| 332— | favorites | BBC News | SDR | HD |
| 314— | not recommended | fff | SDR | SD |
|  | not recommended | iii | SDR | SD |
| 315— | not recommended | aaa | SDR | SD |
| 316— | not recommended | ppp | SDR | HD |
| 317— | not recommended | rrr | HDR | HD |
|  | not recommended | ccc | SDR | SD |
| 318— | not recommended | jjj | SDR | SD |
| 333— 319— | not recommended | qqq | HDR | HD |

|  | 450 | 451 | 452 | 453 |
|---|---|---|---|---|
| 430 | favorites | Sci-Fi Movies Channel | HDR | HD |
| 431 | favorites | NatGeo | HDR | HD |
| 432 | recommended | History Channel | HDR | HD |
| 402 | favorites | Starz | SDR | HD |
|  | favorites | SyFy Channel | SDR | HD |
|  | favorites | TCM | SDR | HD |
|  | favorites | BBC News | SDR | HD |
|  | recommended | China News Network | SDR | HD |
| 403 | recommended | Al Jazeera News | SDR | HD |
| 433 | recommended | Meteor | SDR | SD |
|  | not recommended | aaa | SDR | SD |
|  | not recommended | bbb | SDR | SD |
|  | not recommended | ccc | SDR | SD |
|  | not recommended | ddd | SDR | SD |
|  | not recommended | eee | SDR | SD |
|  | not recommended | fff | SDR | SD |
|  | not recommended | ggg | SDR | SD |
|  | not recommended | hhh | SDR | SD |
|  | not recommended | iii | SDR | SD |
|  | not recommended | jjj | SDR | SD |
|  | not recommended | kkk | SDR | SD |
|  | not recommended | lll | SDR | SD |
| 404 | not recommended | mmm | SDR | SD |
|  | not recommended | nnn | SDR | HD |
|  | not recommended | ooo | SDR | HD |
| 405 | not recommended | ppp | SDR | HD |
| 434 | not recommended | qqq | HDR | HD |
|  | not recommended | rrr | HDR | HD |

Input

↓ 510 determine a plurality of available services providing content, wherein each service has an associated content format

↓ 520 determine an order of the plurality of available services, based on the content format of each service and a sequence of switching between the plurality of available services, to reduce a transition time when switching, based on the sequence, from a first one of the plurality of available services to a second one of the plurality of services different from the first one

↓ 530 generating, based on the order, a list of the plurality of available services representing a program guide, wherein the first and second services are adjacent in the program guide

↓ 540 enabling, based on the program guide, switching from the first service to the second service

SYSTEM, APPARATUS AND METHODS PROVIDING A USER INTERFACE

CROSS REFERENCE TO RELATED APPLICATIONS

This application is a U.S. National Stage Application under 35 U.S.C. § 371 of International Patent Application No. PCT/US2021/037646, filed 16 Jun. 2021, which is incorporated herein by reference in its entirety.

This application claims the benefit of U.S. provisional patent application No. 63/040,351 filed 17 Jun. 2020, which is incorporated by reference herein in their entirety.

TECHNICAL FIELD

The present disclosure involves content delivery systems, devices and methods.

BACKGROUND

A system or device for receiving content, e.g., a receiver such as a television or a set-top box, able to receive a variety of linear services such as television programming, typically offers a user interface such as an electronic program guide (EPG) that lists those linear services. In general, such services are listed by channel, which may be virtual channels, and are presented in numeric order. Remote controls typically offer "CH+" and "CH−" buttons, to step through the available services in ascending or descending order. "Channel surfing" is the practice of using these buttons to step sequentially through these services and is a technique historically popular among viewers when searching for something to watch.

SUMMARY

In general, at least one example of an embodiment described herein can involve apparatus comprising: one or more processors configured to determine a plurality of available services providing content, wherein each service has an associated content format; determine an order of the plurality of available services, based on the content format of each service and a sequence of switching between the plurality of available services, to reduce a transition time when switching, based on the sequence, from a first one of the plurality of available services to a second one of the plurality of services different from the first one; generate, based on the order, a list of the plurality of available services representing a program guide, wherein the first and second services are adjacent in the program guide; and enable, based on the program guide, switching from the first service to the second service.

In general, at least one example of an embodiment described herein can involve a method comprising: determining a plurality of available services providing content, wherein each service has an associated content format; determining an order of the plurality of available services, based on the content format of each service and a sequence of switching between the plurality of available services, to reduce a transition time when switching, based on the sequence, from a first one of the plurality of available services to a second one of the plurality of services different from the first one; generating, based on the order, a list of the plurality of available services representing a program guide, wherein the first and second services are adjacent in the program guide; and enabling, based on the program guide, switching from the first service to the second service.

In general, at least one example of an embodiment as described herein provides a computer program product having stored thereon program instructions that, when executed by one or more processors, perform a method in accordance with one or more aspects and/or examples of embodiments described herein; and/or a non-transitory computer readable medium storing executable program instructions to cause a computer executing the instructions to perform a method according to any example of an embodiment in accordance with the present disclosure; and/or an electronic device including apparatus as described herein and one or more additional features such as a display or antenna, etc.

The above presents a simplified summary of the subject matter in order to provide a basic understanding of some aspects of the present disclosure. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description provided below.

BRIEF DESCRIPTION OF THE DRAWING

The present disclosure may be better understood by considering the detailed description below in conjunction with the accompanying figures, in which:

FIG. 3 illustrates an example of a listing of content services and content in accordance with at least one example of an embodiment;

FIG. 4 illustrates another example of a listing of content services and content in accordance with at least one example of an embodiment;

FIG. 5 illustrates, in flow diagram form, another example of an embodiment; and

Figure 1:
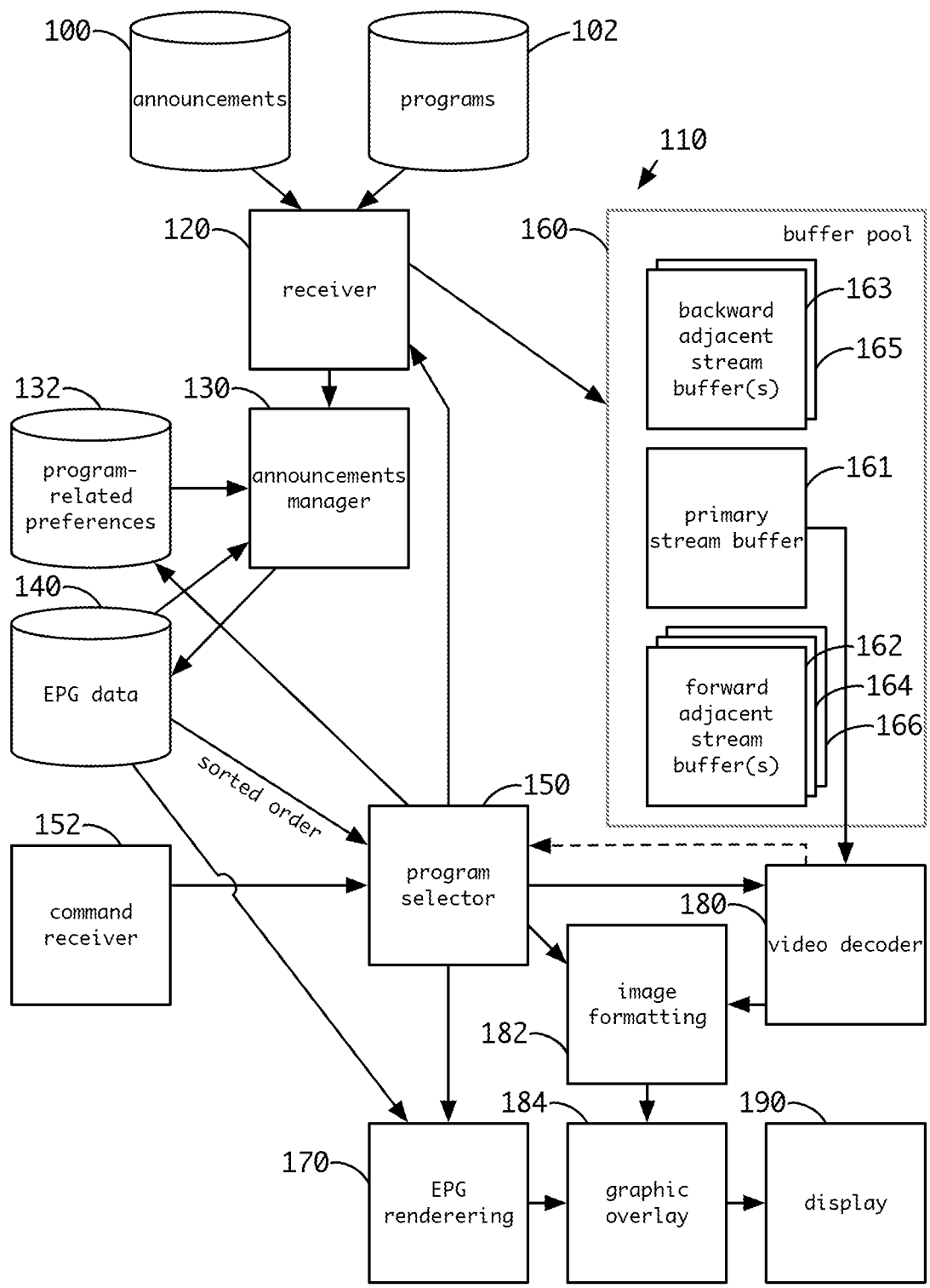
FIG. 1 illustrates, in block diagram form, an example of an embodiment.

It should be understood that the drawings are for purposes of illustrating examples of various aspects, features and embodiments in accordance with the present disclosure and are not necessarily the only possible configurations. Throughout the various figures, like reference designators refer to the same or similar features.

DETAILED DESCRIPTION

Channel surfing was particularly popular in the days of analog TV. Switching channels retuned the television RF receiver, and the video of the newly tuned channel was available within little more than a frame time, typically about 1/30 of a second, but for most TVs, not longer than 1/15th of a second.

With digital TVs and compressed video, channel switching time suffered from two significant limitations: GOP length and format changes.

First, upon channel change, the receiver needed to wait for the start of a group of pictures (GOP), which was the minimum decodable element. The receiver had to acquire an independent frame (an 'I-frame'), which would appear in the stream once every second or two. An I-frame could be decoded immediately once received, and it was instrumental for decoding the next second or so of subsequent frames, which were encoded as progressive or bidirectional frames ('P-frame' or 'B-frame', respectively) and which made reference to the I-frame in ways that made their encoding even more efficient. The collection of encoded frames that began with an I-frame and included all the subsequent P- and or B-frames that depended on it (until the next I-frame) was called a GOP, or "Group of Pictures".

Longer GOPs, i.e., those with a greater number of frames encoded using that leading I-frame, as compared to shorter GOPs, end up making more efficient use of bandwidth and permit better video quality for an individual service. However, shorter GOPs offer a quicker expected switching time: The expected wait before you receive a picture, when switching between services, is based on the GOP length, or average GOP length within a service if it varies, of the service to which you are switching.

In seconds, the expected wait-before-picture due to GOP length is the average GOP length, in frames, times the frame rate, divided by two, plus the average duration to receive a full I-frame. The reason for the expected wait, or latency, is as follows. When a user switches to a different service, the receiver immediately begins receiving the transport stream, but reception begins somewhere within the currently transmitted GOP. If that is near the beginning of the current GOPs, the receiver must wait for almost the complete GOP to pass. That is, the GOP is essentially useless to the receiver because the receiver does not have access to the I-frame. Stated differently, by having just missed the start of the GOP, the receiver essentially misses all of the GOP. Timing of the service may be such that the receiver begins receiving the new service near the end of the GOP. The GOP is still useless to the receiver, but very little of the current GOP remains before the next GOP starts. On average, the receiver will begin receiving the new service, or "drop in" to the new service, at the beginning of a GOP as often as at the end. For example, a receiver will drop in ¼ of the way through the GOP, whether measured in bytes or in transfer time, as often as ¾ of the way through. Therefore, the expected value for the drop-in point is half-way through the GOP. If frames come at 30 per second and a GOP is 60 frames long, the GOP represents two seconds of reception, and expecting to wait for half of that corresponds to one second. However, that is just until the I-frame starts, and I-frames are not as efficiently coded as the subsequent P- or B-frames, and receiver must have a complete I-frame before it can be displayed on the screen.

As an example, an average (or fixed) GOP length of two seconds, divided by two, plus an average duration needed to receive an I-frame of, say, ¹⁄₁₅th of a second, which would be the duration of two video frames once decoded, would produce a total switching time of 1¹⁄₁₅ seconds, i.e., 1.067 seconds. In an example where such a switching speed is typical, this represents a channel surfing rate about 30 times slower than that capable with an analog broadcast.

The second source of channel switching delay is switching between channels that will not be displayed in the same video format. That is, there is an effective change in, e.g., resolution, transfer function, colorimetry, or frame rate associated with the new service to which the receiver switches. In such a circumstance, a video pipeline comprising, by way of example, decode, rendering, and presentation stages, will require multiple stages of video frame buffers and image processing blocks, each having specific parameters set appropriately for the format of the video to be conducted, e.g., a buffer frame buffer size is based on video resolution, the alternation rate of double-buffered frame stores is synchronized to the frame rate, rendering functions may be based on a one or more look-up tables (LUTs) that get filled according video parameters such as colorimetry and transfer function.

The video processing pipeline within a device such as a television is carefully streamlined and optimized for capability and power efficiency, however it is generally not optimized for switching speed. The effective behavior for changing formats is effectively a reboot of the pipeline, using the provided video parameters available once the stream is being received. A pipeline is typically three stages deep, but can be more or less. Typically, the stages operate in synchronization at the frame rate. In some cases, the pipeline includes the decoder, for example if content is being received over the air, and in other cases does not include the decoder, e.g., if that is handled by a set-top box (STB) receiver, but then communications need to be negotiated for the interface between the STB and the display. In the case of LUT-based video processing, one or more LUT(s) need to be populated and depending on the size of the LUT(s) and the complexity of the transform(s) being computed to generate it, that can take some time. There can be other changes. Once the pipeline is configured, for the new video format, images enter the pipeline and begin their generally synchronous progress through it. In parallel, audio processing follows a similar procedure, though it is often the case that audio buffers are much deeper, and audio can take longer to be ready.

In general, at least one example of an embodiment described herein involves reducing the expected time to acquire the next I-frame of the next service in the guide. In general, at least one other example of an embodiment involves reducing the likelihood of needing to reconfigure the video pipeline for a different video format. In general, at least one other example of an embodiment described herein provides a method and apparatus for ordering services within a user interface indicating available services, e.g., a list of services such as an electronic program guide (EPG), such that the expected transition time when switching between services or channels adjacent in the list guide channels is reduced, if not minimized, thereby improving the channel surfing experience.

In general, at least one other example of an embodiment can involve providing for an arrangement of features comprising a plurality of stream buffers, each stream buffer assignable to a designated service; a program selector that assembles a first list of services, the first list of services selected from a second list of available services, the first list selected by the program selector on the basis of at least one program-related preference, the first list of services having a sequence, the program selector having a first service of the first list, the first service being currently selected, each service in the second list having a corresponding video format; a first stream buffer, wherein the program selector causes a first stream corresponding to the first service to be accumulated in the first buffer; a second stream buffer, wherein the program selector causes a second stream corresponding a second service to be accumulated in the second buffer, the second service being adjacent in the sequence to the first service; an image formatting module, wherein the image formatting module receives a first configuration from the program selector based on the video format corresponding to the first service; a video decoder, wherein the video decoder is directed by the program selector to decode first images from the first buffer once the first buffer has accumulated at least one I-frame, the video decoder provides the first images to the image formatting module, the image formatting module provides second images for one of display and subsequent processing based on the first configuration; a command receiver, wherein the command receiver accepts a first command to advance to the second stream and provides a first signal representative of the first command to the program selector; wherein the program selector designates the second service as being currently selected; if the video format corresponding to the first service is the same as the video format corresponding to the second service, then a second configuration is the first configuration, otherwise the second configuration is based on the video format corresponding to the second service and the image formatting module receives from the program selector the second configuration; the video decoder directed by the program selector to decode third images from the second buffer once the second buffer has accumulated at least one I-frame; the video decoder provides the third images to the image formatting module; the image formatting module produces fourth images for the same one of display and subsequent processing based on the second configuration; and, wherein the sequence is chosen to minimize the likelihood that the first and second configurations are different.

For ease of explanation, various examples of aspects, embodiments and features will be described herein based on an example of systems, devices and services compliant with a particular standard, e.g., ATSC 3.0. However, such description is not limiting. The examples described herein may also be implemented using other signals or standards or be applied to systems and devices processing other forms of signals or compliant with other standards. Also, one or more examples of systems and devices will be referred to herein as a receiver or television or television receiver such as a digital television (DTV). However, a receiver as described herein could be any type of electronic device receiving content or services including, but not limited to, a television or television receiver (e.g., DTV), a set-top box, a gateway device, an OTT device (e.g., Apple TV), a computer, a laptop, a mobile device such as a smart phone or tablet, content receiving or processing systems including one or more virtual components or completely based on virtual components (e.g., "in the cloud" such as a DVR feature provided by a head-end service), etc. In addition, services, content, content signal, or signal providing content as referenced herein will, for ease of explanation and only as an example, generally be described as providing television content such as television programming. However, references to services or content as used herein can refer to television signals or programming, video content or programming, audio content or programming, movies, etc.

As mentioned above, one example of a broadcast distribution system suitable for use with, or for implementing the various examples of aspects, embodiments, and features described herein is ATSC 3.0, in which the available Services and Programs are Announced in accordance with the ATSC 3.0 Standard A/332. In compliance with A/332, Announcements can be constructed to describe one or more services, each of which could be made available through a virtual channel, and within each service, a number of presently available and future scheduled programs. Presently, A/332 describes the contents of those programs, e.g., the title, a description, what language versions are available for the main audio, what languages are available for subtitles or captions.

Such Service Announcements can indicate content properties, such as "video formats (3D, SD, HD, UD), audio formats (stereo, 5.1, immersive)" [ATSC 3.0 A/332 § 5.1] and "provides receivers with a robust description of the available services and content." [op.cit. § 5.2.1] A/332 provides for a "capabilities expression", which is said to describe "multiple alternate sets of capabilities and capability groups, the support for any one set of which is sufficient to create a meaningful presentation". [op.cit. § 5.2.2.3.3.1] However, A/332 describes a limited set of codes to represent such capabilities and capability groups. For example, while A/332 purports to allow a user to filter a guide based on video formats, where 3D, standard definition (SD), high definition (HD), and ultra-high definition (UD) are offered as examples, the announcements for services and programs do not indicate the resolution of the content, including circumstances where multiple different formats might be supplied.

With present services such as those based on ATSC 3.0, a receiver typically does not know what the video properties present on a service will be in any detail until actually receiving the video signal itself. In the case of channel surfing, progressively jumping from one service to the next in numeric order (e.g., with the CH+ button on the remote) can produce differing video formats as described above. One result can be an essentially random order of formats, resulting in a relatively high expected incidence of needing to change video formats, thereby causing an expected delay, along with the further and separate delay associated with accumulating the first I-frame of the next GOP for the new channel.

In general, at least one example of an embodiment described herein addresses the seemingly random ordering of video and other technology formats by providing a user interface such as an EPG wherein the presentation of available content and services, e.g., the listing in a guide or EPG, is sorted based on video formats, such that similar video formats appear in proximity in the user interface, e.g., consecutively in the guide, such that channel surfing encounters a change in video and/or other formats as infrequently as possible, thereby reducing or minimizing the number or frequency of video render pipeline reinitializations to accommodate a change in video formats.

In general, at least one example of an embodiment described herein addresses I-frame acquisition times for the next channel, based on buffering the streams for services adjacent in the guide, in at least a low fidelity, to quickly, if not immediately, be able to support a switch to such adjacent service. If additional stream buffers and/or bandwidth is available, one or more additional services that are neighboring a currently selected channel or service in the guide may be kept available for relatively rapid switching to one or more of these neighboring channels or services based on refreshing correspondingly allocated stream buffers. In the case of channel surfing, when the selection of the current service is advancing in a particular order, the services whose streams are being buffered can be biased in the direction of the advancing order of selection.

Scalable High-Efficiency Video Codec (SHVC) protocols can be used with short-GOP, low fidelity base-layer signals accumulating in such anticipatory stream buffers, where the advantage of short-GOP encodings are that fewer frames, still in the encoded stream, are required to be buffered, i.e., the number of frames from the most recent fully-received I-frame onward does not grow as large as would occur with a longer-GOP encoding. Such short-GOP encodings can provide for faster switching times because the expected wait time is half the duration of the GOP plus the time to accumulate the next I-frame, and that expected wait time is less for shorter-GOP than for longer-GOP encodings. Once a service has been selected, playout can proceed as soon as an I-frame is available.

If SHVC protocols are supported for a service selected and being presented, the receiver can immediately, or after some delay, begin to acquire the corresponding enhancement-layer, which in conjunction with the base-layer already being presented can begin producing a higher resolution, higher fidelity image. The enhancement layer can have its own sequence of I-frames and P- and/or B-frames, which need not be aligned with corresponding frame types in the base-layer. Generally, the enhancement layer will use a longer GOP structure, so that the encoding is more efficient. The ability to rapidly acquire a displayable image is not so critical in the enhancement layer as the base-layer can already be displayed. Preferably, the contribution of the enhancement layer, once available, can be gradually faded in, so that there is not an abrupt discontinuity in image quality.

Figure 2:
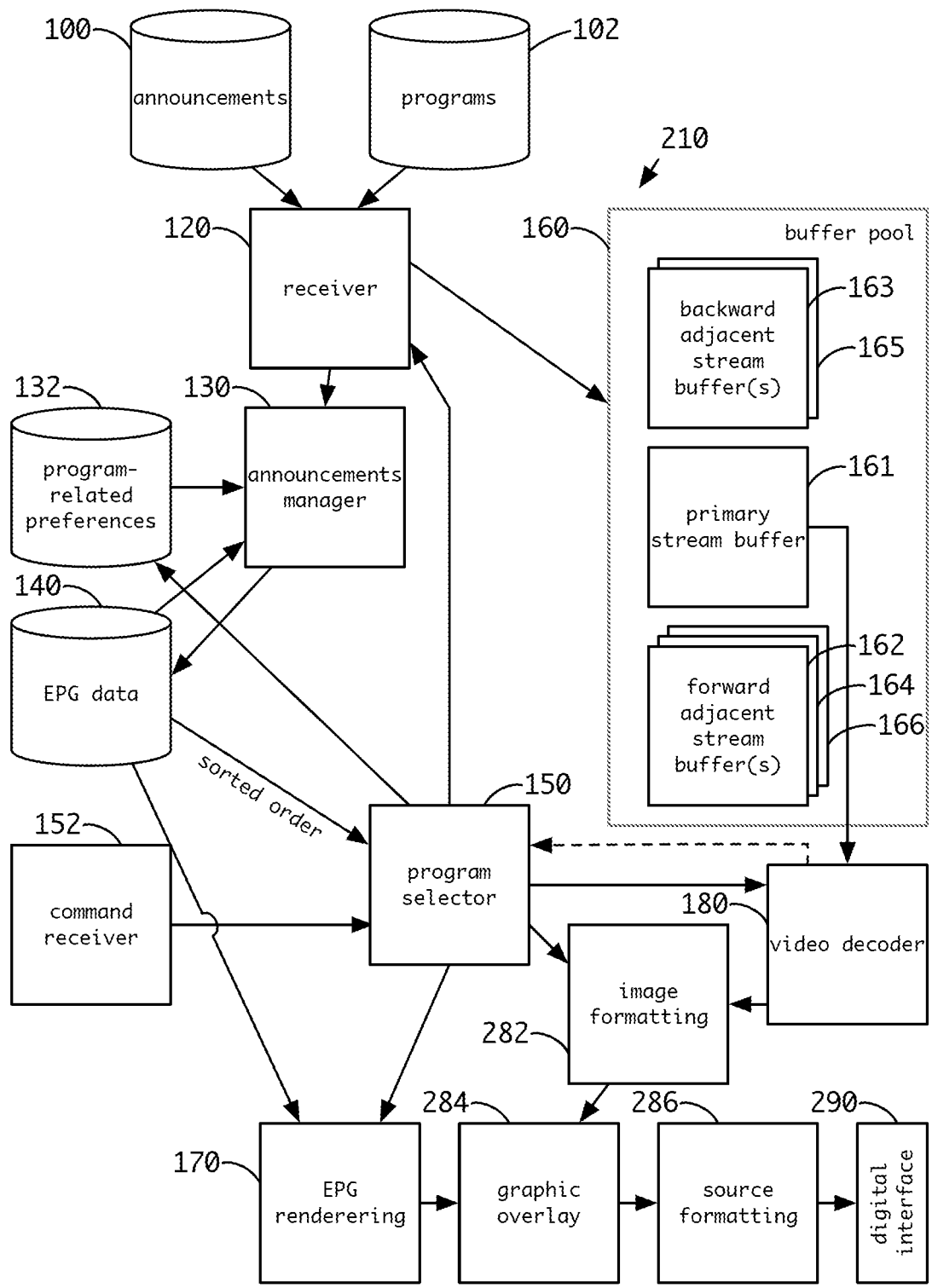
FIG. 2 illustrates, in block diagram form, another example of an embodiment.

Turning now to the drawings, examples of embodiments will first be described with regard to FIGS. 1 through 4. Briefly:

FIG. 1 shows a system block diagram of an example an embodiment of a device, e.g., a television receiver, in accordance with the present disclosure;

FIG. 2 shows a system block diagram of another example of a device, e.g., a set-top box, in accordance with the present disclosure;

FIG. 3 illustrates an example of a service list prior to sorting based on an example of an embodiment as described herein; and, FIG. 4 illustrates an example of a service list such as that shown in FIG. 3 but after sorting based on an example of an embodiment as described herein.

As noted above, it should be understood that the figures are provided only as examples to aid in understanding the present disclosure and are not necessarily the only possible configurations and, therefore, are not intended to be, and are not, limiting with regard to the various aspects, embodiments and features described herein.

Regarding FIG. 1, at least one example of an embodiment described herein can be considered in the context of a television 110, with receiver 120 that is able to obtain announcement for services and programs 100 as well as the programs 102 themselves.

Announcements are passed from receiver 120 to announcements manager 130, which stores announced information regarding current and upcoming programs in EPG data 140. Certain program-related preferences 132 are used by the announcements manager, for example to note which video formats are preferred, which resolutions are preferred, which services are preferred, etc., and such preferences are used by the announcement manager 130 in the prioritization of the EPG data.

Such preferences can be default values and will typically begin there. Such preferences can be adjusted by a user of the device using explicit commands received by command receiver 152 (shown here, by way of example, to operate through the program selector 150).

The command receiver 152 can be configured to receive commands from a user interface on the television itself, from a remote control, through a voice command detector, issued from a smart home controller, (none of which is shown).

In the alternative, or additionally, such preferences of the user can be learned based on the user's actual behaviors with respect to which programs are selected and their properties. For example, each time a particular service is selected through command receiver 152 to be accessed by program selector 150, the likelihood that the current program and the corresponding service are user favorites increases. This consideration should be further based on the amount of time the program or service is selected, along with other information, such as whether audio is muted, or if the controls are occasionally being adjusted. For example, once a program has been watched for 15-minutes, it could be increasingly considered a favorite, but if watched for less time than that threshold, the user's attention might not be considered as engaged, and the becoming a favorite need not be considered yet. In another example embodiment, the three services that garner the highest corresponding aggregate viewing time in an interval can be considered as favorites.

For such selected services and programs, the corresponding parameters of the video format present in the broadcasts should also be increasingly considered to be preferences. For example, if the system detects that the likelihood of high resolution content being watched is greater than the fraction of services offering high resolution content when anything is being watched, then high resolution could be considered as an increasingly likely user preference, which the program selector 150 can note in the program-related preferences 132.

Other preferences for video format, including colorimetry (i.e., standard gamut, such as that based on ITU-R Recommendation BT.709 vs. wide color gamut, such as that based on ITU-R Recommendation BT.2020 or BT.2100), dynamic range (i.e., standard dynamic ranges, likewise based on BT.709 or BT.2020 vs. high dynamic range based on ITU-R Recommendation BT. 2100), frame rate (e.g., 24 vs 30, vs 60 vs higher), and stereoscopic 3D or not, represent several example parameter values contributing to an individual video format.

The announcement information 100 can contain information regarding the format of the video available in each of the available programs 102, as this provides such information prospectively. Alternatively, such video format information for a service or a current program can become available once the program is being received. In this latter case, the information might no longer have predictive value for the current program. However, services are generally disposed to change their video format infrequently and, therefore, a video format most recently observed for a given service is significantly predictive of the video format that will be encountered on that service later, for example for the next program on that service, or for tomorrow's programs on that service, etc. This is particularly the case for linear services. Thus, if announcement information 100 does not contain the video format information of a current program, the video decoder 180 or other element (not shown) having access to the video captured in the stream buffer pool 160, may discern the video format and communicate it to the program selector 150, as shown by the dashed line, by which course the preferences in the program-related preferences 132 can be updated.

In some cases, a program listed in the announcements 100 may be available in several video formats. In such cases, the selection by the user of one available format vs. a different available format is a clearer indication of a relative preference and may be considered accordingly.

Announcements manager 130 uses the program-related preferences 132, which may merely be default values, to sort the EPG data 140 related to at least the linear services (as opposed to video-on-demand services), so as to organize their expected video formats in groups having a consistent video format. The sorted EPG data forms a services list that is used by the program selector 150. The services list 300/400 is discussed in more detail in conjunction with FIGS. 3 and 4.

Continuing with FIG. 1, the program selector 150 begins in a position in the current services list derived by the announcement manager 130 from EPG data 140 and the program-related preferences. Upon receipt of a channel selector command from command receiver 152, as when the user presses the "CH+" key on the remote control (not shown), the program selector advances to the next position in the services list and initiates several processes.

First, if the video format of the previous service is different, the program selector 150 can direct the image formatting module 182 to prepare for the new video format. The purpose of the image formatting module 182 is to accept video from the decoder 180 and convert the format of that video to whatever video format is used for the next steps of video processing, e.g., by the graphic overlay module 184, and display 190. The video format to which the image formatting module 182 is to be configured could be extracted from the video signaling of the corresponding video stream. In general, at least one example of an embodiment involves extracting such information in advance of accessing the video stream, and can further involve, for example, changing only those settings of the image formatting module 182 that are different. Changing only certain settings or only a subset of settings can be an desirable if some settings take more time to alter than other settings take, e.g., if it takes longer to switch the input video transfer function because it takes a long time to repopulate the look-up tables (LUTs), as compared to the time it takes to change resolutions, perhaps because an example implementation always uses the same large video frame buffers for all video frame sizes and the only thing that changes is the metadata regarding how big the image is. Such information on performance in response to change for image formatting module 182 can be used to inform the sorting of service list 300/400.

Second, the program selector 150 induces the video decoder 180 to take data from a stream buffer 161 in the video stream buffer pool 160, the stream buffer 161 becoming the primary stream buffer because it corresponds to the service that corresponds to the newly selected list position. If primary stream buffer 161 has already accumulated an I-frame, the video decoder can proceed immediately to begin decoding.

Third, to the extent that receiver 120 is able to receive a plurality of video streams in parallel, and to the extent that the video stream buffer pool 160 has available stream buffers, receiver 120 is directed by the program selector to begin buffering the streams of services that are adjacent in the services list to the currently selected position. Which is to say, buffering the streams for the services corresponding to positions in the services list adjacent to the currently selected position. Of course, if some of the capability for receiver 120 to receive a plurality of video streams is already allocated, e.g., to record a program from a service in the background (not shown), then the usable extent of the receiver's ability to receive multiple video streams is correspondingly reduced. Likewise, such pre-allocations may reduce the number of video stream buffers available for use in this way in pool 160.

As an example, the stream of the next adjacent service would be buffered in forward adjacent stream buffer 162, and the stream of the previous adjacent service would be buffered in backward adjacent stream buffer 163. Note that in the present example, having recently received a CH+ command, the backwards adjacent stream buffer 163 represents the service that immediately prior had provided the primary stream. Accordingly, this stream buffer 163 should already be filled, making it immediately usable by video decoder 180 should the user reverse the direction of "channel surfing" with a CH− command. Each stream buffer, besides the primary stream buffer 161, being employed in this way, operates as a circular buffer that should be large enough to accumulate an entire GOP including its I-frame, plus at least the entirety of the next I-frame. In that way, such a stream buffer can be continuously ready to be played by video decoder 180, beginning with the stream buffer's most recently completed I-frame. In the alternative, if such stream buffers are allowed to accumulate more of the assigned video stream than that, video decoder 180 could begin with any completed I-frame in the stream buffer, from the earliest to the most recent, with different choices offering different capabilities. For example, a stream buffer of several minutes duration can offer bit of skipping forward, or backward, though while such a stream buffer has been allocated to the stream of a service too recently, the full extent of that capability might not yet be available.

This process continues allocating additional forward buffers 164, 166 to the consecutive services ahead in the list and additional backward buffer 165. For any one advance of the current position in the services list, there is typically only one new service being assigned to one forward buffer, e.g., 166. The remainder of the buffers were already assigned to services that are, or were, already close to the present service in the list. As the number of buffers in buffer pool 160 is typically less than the number of services on the list, the trailing-most buffer, i.e., the buffer corresponding to the least-adjacent service on the list in the direction opposite the immediate move, is released. Typically, this is the stream buffer that is going to be newly assigned, that is, what has become the forward-most buffer 166 was until recently, being used as the backwards-most buffer 165.

Note that in this discussion of these stream buffers, the designations of forward-most, forward adjacent, backward adjacent, etc. are all logical designations which can be dynamically assigned and need not correspond to specific, fixed buffers, physical or logical. Ideally, management of the buffers in this way is a very "lightweight" or low-complexity process, handled by the appropriate I/O control processor(s) (not shown) configured by the receiver 120 under the direction of the program selector 150, either of which may call out the buffers to be used in pool 160, as long as video decoder 180 is able to identify primary stream buffer 161.

Primary stream buffer 161 is typically a much larger buffer, at least logically. It may be circular too, but typically offers a much longer capture, e.g., an hour or perhaps considerably more. This allows the currently selected service to accumulate the video for use in "trick play" modes, such as 'pause', 'rewind', 'fast forward', and the regular 'play', any of which might be called for with the remote (not shown) and detected with the command receiver 152.

While illustrated here as a single entity, primary stream buffer 161 can rely on a tiered memory architecture: A substantial portion of the storage for stream buffer 161 is likely to be implemented as mass memory, such as a hard disk or flash drive, with only an immediate portion being retained in RAM memory, with I/O control processors dispatched to manage transfer of data among the different tiers so that video decoder 180 need not be concerned. The details of such tiered storage in conjunction with video stream capture is well known.

In some example embodiments, if the announcements 100, as reflected in the EPG data 140, indicate that a particular service, besides being available live, is also available other than live, e.g., the most recent hour from the otherwise live program is maintained for access via broadband, then the program selector 150 can provide the receiver 120 with the appropriate link information, and the receiver 120 can undertake to access the corresponding stream from a broadband source for programs 102, This may permit a more rapid population of the allocated stream buffers before the corresponding service has been selected by the user, and afterward, it might permit the trick-play access to the corresponding program for times prior to the user having selected the service and even before the service was being buffered to the stream buffer pool 160.

From this it is clear that receiver 120 may have access to announcements 100 and programs 120 over-the-air, e.g., by television antenna (not shown), or by broadband access, e.g., via the Internet (not shown), or both. In typical implementations, announcements 100 come from many different sources, generally one per broadcast facility, with each broadcast facility supporting one or more services. In both ATSC 1.0 and ATSC 3.0, each television broadcast signal uses time-domain multiplexing to carry multiple services, and all the services available on that signal are represented in the announcements on that radio-frequency (RF) television channel. Other services carried on other RF channels are accompanied by announcements on the corresponding channel. In some cases with ATSC 3.0, a link may be transmitted for obtaining the announcements for a channel via broadband and such announcements could be more complete, and may include announcements that are more prospective.

When video decoder has received and decoded the appropriate I-frame in primary stream buffer 161, and image formatting module 182 is configured to interpret that frame's video format, then the resulting video formatted appropriately for the display (or, depending upon implementation, to an intermediate format that is subsequently processed into the correct format for the display), is sent to graphic overlay module 184 where any menus from a menu display module (not shown), clock indicator from a clock display module (not shown), EPG-derived graphics from EPG rendering module 170, or the like, is overlaid into the video for delivery to display 190. The result is that the selected video service is being played on the display, perhaps with information from the program guide, e.g., showing details about the currently selected service, e.g., the name of the current show, maybe other details such as actors, year of release, etc.; time remaining; or the name of the next show on this service (e.g., "coming up:").

One feature or aspect associated with the buffers in pool 160 is that, as the user moves sequentially up or down through the services list, the buffers are gathering the streams from the several most likely services, such that by the time the user has advanced to a particular choice on the list, the buffer that corresponds to that service is likely to already have an I-frame ready to play with no delay, or at worst, a reduced delay since the buffer has already worked through a portion of a GOP without an I-frame and the user need only wait for the remainder of the GOP until the I-frame is acquired.

As the user is advancing in one direction through the services list, allocations of stream buffers in pool 160 can be biased in the direction of the advance. Thus, in FIG. 1, forward adjacent stream buffers 162, 164, 166 are three buffers, while backward adjacent stream buffers 163, 165 are only two. In some embodiments, this differential could be more dramatic. However, if the user suddenly changes direction, e.g., while channel surfing, something just seen catches the user's attention and the direction of the advance is suddenly reversed. In this situation, the direction of the program selector 150 can be for the number of backward adjacent stream buffers to increase, typically as a reassignment of the prospectively loaded, least-adjacent forward buffers. This improves the likelihood of encountering an I-frame in a requested video stream buffer while working with a limited buffer pool 160.

One feature or aspect of the program selector having access to the video format information, whether from the announcements data 100 or by having accumulated the information for each service historically by way of the video decoder 180 (by way of the dashed-line as described above), is that the image formatting module 182 has the opportunity of beginning configuration to the appropriate format earlier.

FIG. 2 represents another example embodiment, that of set-top box (STB) 210, which operates in a substantially similar manner, and comprises many elements also found in television 110. Rather than having its own display 190 as did television 110, STB 210 has a digital interface 290, or perhaps another video interface (not shown), either for providing a video signal to one or more displays (not shown). Accordingly, the video processing is somewhat different to appropriately accommodate the external display.

By way of example, the digital interface 290 could implement an uncompressed high-speed digital media interface protocol, such as standardized by the Consumer Electronics Association in their series of standards CTA-861 (most currently CTA-861-G, as amended by CTA-861.4). This standard provides the basis protocols used for popular digital video interfaces, connectors, and cables, such as the High-Definition Multimedia Interface (HDMI), a proprietary specification licensed by HDMI Licensing Administrator, Inc. of San Jose, CA; and the DisplayPort digital display interface standardized by the Video Electronics Standards Association (VESA), also of San Jose, CA; either of which provides a non-limiting example of an interface suitable for use in an implementation of digital interface 290.

As before, with the user channel surfing, CH+ or CH− commands are being received at the command receiver 152 of STB 210 and its program selector 150 reacts accordingly, as described above in regard to television 110. Here, program selector 150 may configure image formatting module 282 differently. Whereas in television 110, the nature of display 190 is essentially fixed, and image formatting module 182 might be converting from the whatever video format is being supplied by the video decoder 180 of television 110 to a video format appropriate for display 190, here, a digital video interface 290 of an STB 210 can negotiate with an attached external display (not shown), so as to agree on a format, ideally one best suited to the content at hand and the attached external display (not shown).

Alternatively, in at least one example of an embodiment, digital interface 290 can negotiate to determine a particular format that might be best, optimum, preferable or desirable based on a format or formats for which the external display (not shown) is capable and, to the extent possible, provide video to the external display in the particular format or, for example, exclusively in the particular format. Maintaining the format in a particular format can be desirable in that whenever the video format changes at the digital interface 290, there is a renegotiation with the external display and, as discussed above in conjunction with television 110, its video pipeline is likely to be restarted, causing an undesirable break in the video presentation and this is a poor user experience. By keeping the interface 290 in the same or a particular video format as much as possible, such restarts of the external display's video processing can be avoided, or at least substantially reduced.

In example embodiment of the STB 210, image formatting module 282 provides the image processing for converting the input video format of images from the video decode 180 of STB 110 into an intermediate format suitable for use by graphic overlay module 284. In this way, EPG rendering module 170 in the STB 210, and any other graphic rendering components (none shown), can operate in a common video format with resolution, colorimetry, transfer function, etc. In one example embodiment, this common video format could be set to whatever has been negotiated with the external display by the digital interface 290. In an alternative example embodiment, the digital interface 290 could be configured to negotiate to a predetermined video format that is the common video format. In still another alternative embodiment, the STB 210 employs source formatting module 286 to convert from the common video format used in graphic overlay processor 284 to whatever video format was negotiated by digital interface 290. In this way, digital interface 290 can adapt a particular format to, e.g., a format considered to be the best or optimum format available to both the STB 210 and the external display (not shown).

In the parlance of some digital interface specifications such as those mentioned above, the digital interface 290 is termed the "source" while the external display (not shown) is termed the "sink". Other kinds of devices could be substituted as the sink, allowing the STB 210 to function as a the video source while connected to other kinds of devices, e.g., AV switching or routing equipment, a video recorder, etc., provided that the negotiation with the digital interface 290 can be successful.

FIG. 3. represents a service list 300, populated with data collected by the announcements manager 130 from announcements 100 and stored as EPG data 140. On the basis of certain information in program-related preferences 132, some services for which information is available in the EPG data 140 may be omitted from this list 300.

In one example embodiment, some services in the EPG data 140 may represent services which require a subscription, but for which the user is not subscribed. So, rather than continually telling a user that a subscription is needed but not present, the corresponding services are omitted from this particular function of the EPG. The program-related preferences 132 could be updated and such limited-access services could appear if, for example, the user were to obtain a subscription to such services or if access was enabled in a particular situation such as for a limited time period, e.g., a marketing promotion providing free access for a limited time period. Likewise, if the user were to set a preference to include such services in the services list 300, even without a subscription, for example if the user were contemplating a subscription but wanted to see what kind of programming is offered and when, again the services would appear on the list 300.

In another example embodiment, some services in the EPG data 140 may have been specifically or implicitly flagged to not appear. For example, the user may have set a parental ratings value to exclude services offering programs of a certain rating. A user may have made a selection to skip services that do not consistently offer the primary audio tracks in a particular language (e.g., only show stations for which the primary language track or a dubbed language track is available in a particular language). Further, a user might select certain services individually, to not appear.

Services list 300 illustrates an example of a list arranged in the order of virtual channels, or channel numbers. This is the order in which most EPGs of the prior art will be arranged. The number of the channels is not shown FIG. 3, but the service names are included in column 351. For each service, exemplary video parameters for the corresponding services also appear. For example, the video transfer function appears in column 352, represented in this simplified example as either high dynamic range (HDR) or standard dynamic range (SDR). The video resolution for each service appears in resolution column 353 as either high definition (HD) or standard definition (SD).

For the purposes of the present explanation, information that could or might be displayed is simplified in FIG. 3. For example, certain complexities, such as having multiple forms of HDR, are not being presented. That is, this example pretends, for the sake of simplicity, that there is only one HDR transfer function in use, rather than perhaps three. The principles presented remain the same. Likewise, the resolutions presented are two, while there are already services offered in Ultra-High Definition (UHD) and higher still, though perhaps those were not among this particular user's subscriptions, or were outside this user's interests. Various other types of information, parameters or settings could be included in information presented to a user such as in a listing illustrated in FIG. 3. For example, differences in colorimetry (e.g., standard color gamut and wide color gamut), could be in a separate column, not shown here. Again, however, the principles remain consistent.

In an actual services list 300, any parameter that does not govern timing for updating the image formatting module 182 or 282, can be omitted. For example, if changes in colorimetry are always consistent with changes in transfer function as signaled in column 352, then there is no need to separately track colorimetery in its own column (not shown). Likewise, if a parameter has no meaningful effect when image formatting module 182 is being configured, then there is no need for a corresponding column in services list 300. Such information might be included if it might be used by EPG rendering module 170, to inform the user regarding the properties of the video, but that could also be obtained from EPG data 140 outside of it being on the services list 300.

The horizontal lines 302-318 represent where changes in video format occur as the services are consecutively selected. For example, line 302 represents the change of the video format of service 330, which is HD-HDR, in the form of "<resolution>-<transfer function>", to HD-SDR for service 331 in the following row. A transition from service 330 to service 331, or vice versa, will encounter this change of video format, and potentially induce a delay, depending on the specific implementation of the television 110 or STB 210. Note that at the end of the list 300, after service 333, there is no line where callout 319 is pointing. This is because the video format of service 333 at the bottom of the list matches the video format for service 330 at the top of the list, both are HD-HDR. Thus, when wrapping around, in either direction, e.g., being at the top of the list and pressing CH−, or being at the bottom and pressing CH+, no change to the video format is encountered. If these first and last video formats did differ, a line would be appropriate at 319 to indicate the transition upon wrap-around.

Accordingly, this example services list 300 has 28 services and scrolling through the entire list in the order presented (or its reverse) will encounter 17 video format changes. In this example, a transition is more likely than not to occur when making a random incremental step along the list 300, which is likely to result in a poor channel surfing experience, even if the stream buffers in pool 160 are properly filling.

Column 350 indicates a classification of each service on this list. Some items are marked as favorites, such as the first service 330. This would be determined from program-related preferences 132 and may have been manually set by the user or may have been automatically determined by monitoring the user's viewing habits, or by another determination.

The second item in the services list 331 is a service 331 presenting international news that is marked 'recommended'. In this example, the recommendation is because the user already has another service 332 presenting international news 332.

Many other services are marked as 'not recommended', for example the last service 333. Such services are not excluded from this service list 300 by any information in program-related preferences data 132, so they are included, but they are neither favorites, nor recommendations, so it might be desirable to not intermix such services with the favorites and recommendations, thereby potentially improving or better optimizing the user experience. However, such services remain available in the example, e.g., on the basis of not having a specific reason to exclude them. In an alternate embodiment, such services could be excluded, or a setting might be provided to show more or show less of the services list.

In the example of services list 300, the order in which these stations appear is intended to be their numeric order, or nature order, i.e., the order in which most present-day guides present services. That is, the services are displayed by virtual channel number and subchannel numbers, e.g., 2.1, 2.2, 2.3, 4.1, 4.2, 5.1, etc. or in an STB, this is the channel assignments made by the aggregator, i.e., the cable or satellite company. In some cases, a cable company may assign all the SD services to channel numbers below 1000, and all the HD channels to channel number above 1000, so there is a least a partial ordering of video formats in such a list. Likewise, they may group all, or at least many, of the HD news stations together; or all, or many, of the sports channels. However, such ordering will not be entirely optimal with regard to one or more of the issues described herein. In addition, such ordering is not available for over-the-air broadcasts because there is no central service creating the guide. That is, each broadcaster provides their own ESG (electronic service guide) and the user's television 110 or STB 210 is responsible for accumulating the overall guide for all the available services in EPG data 140.

FIG. 4 shows services list 400, which represents the same services shown in service list 300, except that they have been sorted based on the information available in the program-related preferences 132 as extracted and shown in priority column 450, video transfer function column 452 and video resolution column 453. For reference, the service names are in column 451 and a comparison demonstrates that the other data is the same for the same name in both lists 300 and 400.

If a particular implementation of television 110 happens to have no substantial latency changing certain aspects of a video format, for example the ability to switch resolutions does not represent any substantial latency that would cause a disturbance in a video presentation visible to a viewer, then that particular aspect of the video format need not be used to group the services. This includes subranges of a video parameter, for example, if a television treats all resolutions lower than HD the same way, but treats HD differently, and treats resolutions higher than HD in a single, but different way still, then the video format parameter of resolution might be represented by three subdivisions: <HD, HD, and >HD. There may be distinctions in latency even at the same resolution, for example when switching between two HD formats such a 1080-line progressive scan video and 1080-line interlaced scan video. Such divisions in all the video format parameters are going to be specific to the implementation of the device, e.g., television 110.

Which video format parameter changes take longest should also be considered, for implementations where there is a difference. These too will be specific to each implementation of television 110. The sorting of the groups should attempt to make transitions of such longest-to-configure video format parameters as infrequently as possible in the sorted list of services. That is, the "longest to transition" video format parameter should be the outermost sort, i.e., causing parameter changes associated with the greatest latency or "penalty" to occur least frequently. The collection of pertinent video format parameters represents a compound sort key for the described grouping procedure. Having components corresponding to the video format parameter or parameters that more adversely affect the setup time for the video pipeline when such parameter or parameters is/are being changed, can be the most significant element of that compound sort key, such that the parameter or parameters change less or least frequently.

Such a sort minimizes the expected latency due to video format changes when channel surfing, that is, proceeding service by service through the EPG, in the sorted order.

However, this ordering can sometimes be further optimized by considering which channels are and are not among the favorites. A channel surfing experience among a user's favorite services can be highly optimized in this way, which further ensures that non-favorite services are not interposed among the favorites, thereby creating a potentially annoying delay when there is little likelihood that such an appearance would lead to the user halting to watch a program so presented.

The described sort strategy is usefully extended by admitting services that are meaningfully similar to the favorites. The use of various collaborative filtering, content-based filtering, risk-aware recommendation, and related techniques known to those skilled in the art of content recommendation, can identify services or programs that are likely to become favorites or at least present programs that are not likely to be disliked by or be objectionable to the user. For example, if one lists a particular foreign news service as a favorite, other foreign news services might be included by the sort. Alternatively, if one "favorite" is designated by a user then other similar services might be excluded based on an express user preference (e.g., in a user-specified setting) or implied user preference (e.g., based on a usage history for a particular user). In one example embodiment, such services that are similar to a user's favorite might be collected together in a 'recommended services' grouping in the sort. In that way, their presence does not dilute the concentration of favorites, but does place them ahead of the greater number of non-recommended services. In another example embodiment, 'recommended services' may be inserted among favorites, particularly in a way that does not produce additional service-switching delays when moving sequentially through the guide.

In still another example embodiment, users can prioritize their favorites into two or more tiers, e.g., their most favorites, favorites, and occasional favorites, and the sort can be on the further basis of tiers.

When the guide is being sorted, consideration should be given to the wrap-around point. Guides are most commonly arranged such that moving one past the last entry in the guide takes you to the first entry in the guide. When such is the case, the list can be sorted such that entries at the end of the list have similar video properties to entries at the start of the list, so that when at the top of the list, accidentally backing up or reversing direction in the list does not cause a long transition upon the wrap-around that is immediately followed by another long transition when the user corrects the overshoot.

In the example of services list 400, which is sorted in accordance with one or more of the examples of aspects, embodiments or features described herein, the list starts with service 430, one of the user's favorites. It is presented in HD-HDR, which should represent a high-quality presentation format. Another favorite service 431 is also in HD-HDR, and so is placed adjacent to 430. There are no other favorite services that are also in HD-HDR, which means that the next favorite service will necessarily induce a change in video format. There is a recommendation, however, for a service that is also HD-HDR, and this is inserted as service 432. Positioning a recommendation as described is valuable because this recommendation can be shown without inducing a transition. After service 342, a video format transition is marked by line 402.

In services list 400, there are only four transition lines 402-405. If recommended service 432 were located anywhere lower in the list, being the only 'recommendation' in HD-HDR, it is likely to induce two transitions, i.e., two more transition lines: once switching to it, and once switching away from it. The exception would be if it were put at the end of the list, where because of the wrap-around, it would be adjacent to the top-of-list service 430 having a video format matching that of 434. However, the end of the list can be an undesirable placement for a recommendation, insofar as users typically do not back past the first location in the list, except by accident. It could be the case that such a recommendation might never been seen.

Following recommendation 432 and transition line 402, there are a number of favorites in the HD-SDR format, and these are listed. HD-SDR is still a good quality format and in this example list, is the second preferred format. Once past the remaining favorites, the list 400 has been sorted to provide recommendations that are also in the HD-SDR format. When those are gone, the video format transitions again as indicated by line 403, below which begins SD-SDR. Even here, the system is providing recommendations: service 433 is selected because it offers programming having a similar theme to favorite service 430. However, as illustrated in FIG. 4, there are many services appearing below 433 that have not been recommended, or in the alternative, have a lower priority recommendation than those above. The SD-SDR video format continues down to line 404, where the services' video format starts to improve: HD-SDR. At line 405, the video quality transitions again to HD-HDR so that by the time service 434 is reached, although the service 434 is not recommended, it does have a video format matching the first service 430. Thus, when the wrap-around occurs, a video format transition does not occur.

The sort order of the services list 400 provides an improved user experience, e.g., an improved channel selection or channel surfing experience, by minimizing or otherwise reducing the expected number of encounters with video format transitions. Compare the seventeen video transitions (lines 302-318) in services list 300 with the four video transitions (lines 402-405) in services list 400 sorted as described herein. Likewise, the stream buffering strategy directed by the program selector 150 on the basis of the services list as described herein, minimizes or eliminates waiting for an I-frame to be acquired. This also works to improve the user experience such as a channel surfing experience. Further, the interplay of recommended services into a user interface as described further enhances a user experience such as channel surfing experience that can represent an optimization between video transitions and expected user interests. In addition, user preferences can be used to provide the user with meaningful controls for managing the experience.

Another example of an embodiment is illustrated in FIG. 5. In FIG. 5, embodiment 500 comprises determining, at 510, a plurality of available services providing content, wherein each service has an associated content format. An example of 510 can be determining services available in an electronic device such as a digital television where such services can be signals and/or programming received or available in a device such as a digital television (DTV). The services can originate from one or more of a variety of sources, e.g., broadcast, streaming, recording, smart phone, laptop or other computer, etc. The services can include video and audio content such as television programming. Then, embodiment 500 further comprises, at 520, determine an order of the plurality of available services, based on the content format of each service and a sequence of switching between the plurality of available services, to reduce a transition time when switching, based on the sequence, from a first one of the plurality of available services to a second one of the plurality of services different from the first one. For example, determining an order of a plurality of services can involve sorting or considering available services based on services having similar content formats, e.g., group together services providing high definition content. Then, if a particular switching sequence is also considered when determining the order, the order can reduce a time or latency to switch between services. As an example, if services having a same format are adjacent and have the same or similar format, then a switching sequence such as channel surfing with channel-up and channel-down can result in fewer video format changes, thereby reducing the need to reconfigure a video pipeline, decrease latency, and improve system performance when switching between services as described herein. Then, at 530, a list representing a program guide can be generated based on the order. At 540, switching between services is enabled based on a program guide associated with the list. An example of a list associated with a program guide ordered as described is illustrated in FIG. 4 and described above. In FIG. 4, a program guide based on the ordered list attempts to position first and second services having the same or similar format in adjacent positions in the list such that performance is improved (e.g., switching delay decreased) when switching in a manner such as channel surfing through a program guide.

This document describes various examples of embodiments, features, models, approaches, etc. Many such examples are described with specificity and, at least to show the individual characteristics, are often described in a manner that may appear limiting. However, this is for purposes of clarity in description, and does not limit the application or scope. Indeed, the various examples of embodiments, features, etc., described herein can be combined and interchanged in various ways to provide further examples of embodiments.

Figure 6:
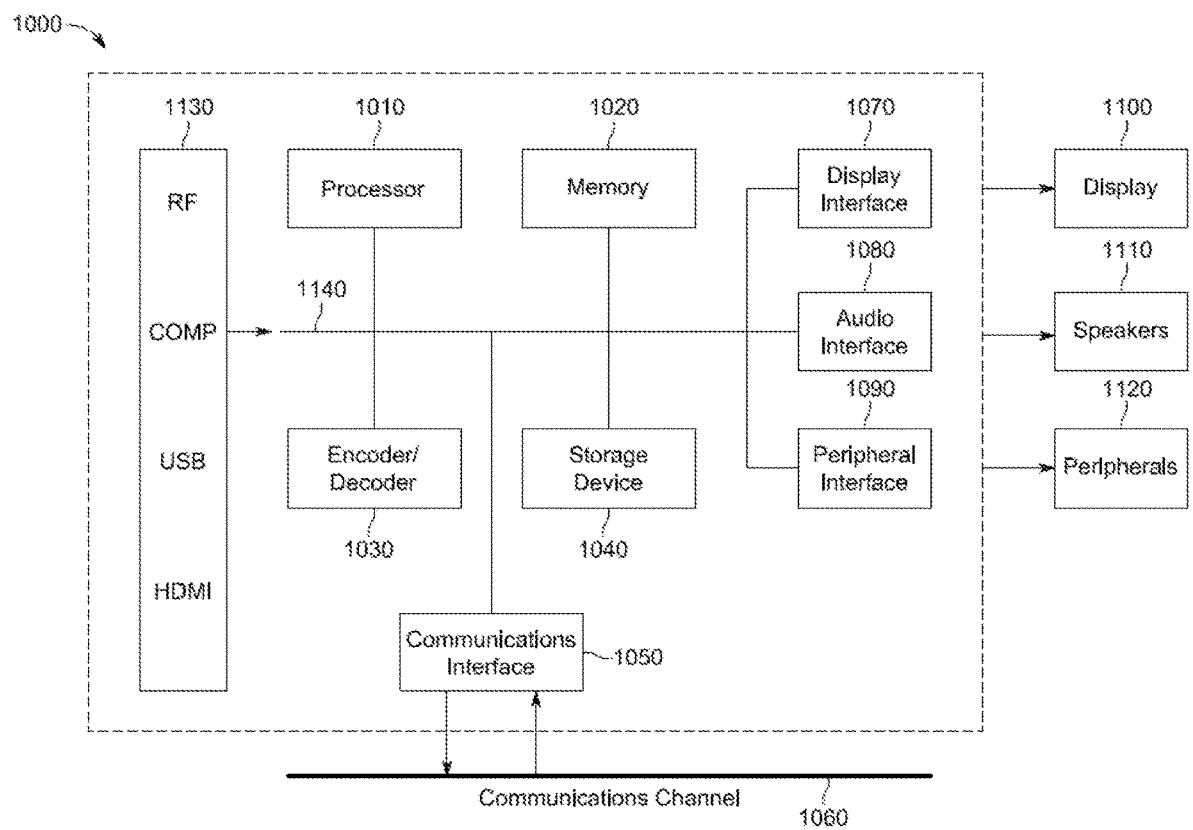
FIG. 6 illustrates, in block diagram form, an example of an embodiment of a system in accordance with the present disclosure.

In general, the examples of embodiments described and contemplated in this document can be implemented in many different forms. Several examples are illustrated in FIGS. 1 to 5 as described above. Another example is illustrated in FIG. 6 described below. Other embodiments are contemplated, and the examples shown in the Figures do not limit the breadth of the implementations. The various examples of embodiments described herein can be implemented as a method, an apparatus, a computer readable storage medium or non-transitory computer readable storage medium having stored thereon instructions for implementing one or more of the examples of methods described herein.

The terms HDR (high dynamic range) and SDR (standard dynamic range) are used in this disclosure. Those terms often convey specific values of dynamic range to those of ordinary skill in the art. However, additional embodiments are also intended in which a reference to HDR is understood to mean "higher dynamic range" and a reference to SDR is understood to mean "lower dynamic range". Such additional embodiments are not constrained by any specific values of dynamic range that might often be associated with the terms "high dynamic range" and "standard dynamic range".

Various methods are described herein, and each of the methods comprises one or more steps or actions for achieving the described method. Unless a specific order of steps or actions is required for proper operation of the method, the order and/or use of specific steps and/or actions may be modified or combined.

Various embodiments, e.g., methods, and other aspects described in this document can be used to modify a system such as the example shown in FIG. 6 that is described in detail below. For example, one or more devices, features, modules, etc. of the example of FIG. 6, and/or the arrangement of devices, features, modules, etc. of the system (e.g., architecture of the system) can be modified. Unless indicated otherwise, or technically precluded, the aspects, embodiments, etc. described in this document can be used individually or in combination.

Various numeric values are used in the present document, for example. The specific values are for example purposes and the aspects described are not limited to these specific values.

FIG. 6 illustrates a block diagram of an example of a system in which various aspects and embodiments can be implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit, multiple ICs, and/or discrete components. For example, in at least one embodiment, the processing and encoder/decoder elements of system 1000 are distributed across multiple ICs and/or discrete components. In various embodiments, the system 1000 is communicatively coupled to other similar systems, or to other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, EEPROM, ROM, PROM, RAM, DRAM, SRAM, flash, magnetic disk drive, and/or optical disk drive. The storage device 1040 can include an internal storage device, an attached storage device, and/or a network accessible storage device, as non-limiting examples.

System 1000 can include an encoder/decoder module 1030 configured, for example, to process image data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream or signal, matrices, variables, and intermediate or final results from the processing of equations, formulas, operations, and operational logic.

In several embodiments, memory inside of the processor 1010 and/or the encoder/decoder module 1030 is used to store instructions and to provide working memory for processing that is needed during operations such as those described herein. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of a television. In at least one embodiment, a fast external dynamic volatile memory such as a RAM is used as working memory for video coding and decoding operations, such as for MPEG-2, HEVC, or VVC (Versatile Video Coding).

The input to the elements of system 1000 can be provided through various input devices as indicated in block 1130. Such input devices include, but are not limited to, (i) an RF portion that receives an RF signal transmitted, for example, over the air by a broadcaster, (ii) a Composite input terminal, (iii) a USB input terminal, and/or (iv) an HDMI input terminal.

In various embodiments, the input devices of block 1130 have associated respective input processing elements as known in the art. For example, the RF portion can be associated with elements for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010. Similarly, aspects of USB or HDMI interface processing can be implemented within separate interface ICs or within processor 1010. The demodulated, error corrected, and demultiplexed stream is provided to various processing elements, including, for example, processor 1010, and encoder/decoder 1030 operating in combination with the memory and storage elements to process the datastream for presentation on an output device.

Various elements of system 1000 can be provided within an integrated housing, Within the integrated housing, the various elements can be interconnected and transmit data therebetween using suitable connection arrangement 1140, for example, an internal bus as known in the art, including the I2C bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed to the system 1000, in various embodiments, using a Wi-Fi network such as IEEE 802.11. The Wi-Fi signal of these embodiments is received over the communications channel 1060 and the communications interface 1050 which are adapted for Wi-Fi communications. The communications channel 1060 of these embodiments is typically connected to an access point or router that provides access to outside networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130.

The system 1000 can provide an output signal to various output devices, including a display 1100, speakers 1110, and other peripheral devices 1120. The other peripheral devices 1120 include, in various examples of embodiments, one or more of a stand-alone DVR, a disk player, a stereo system, a lighting system, and other devices that provide a function based on the output of the system 1000. In various embodiments, control signals are communicated between the system 1000 and the display 1100, speakers 1110, or other peripheral devices 1120 using signaling such as AV.Link, CEC, or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device, for example, a television. In various embodiments, the display interface 1070 includes a display driver, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Systems or apparatus or methods in accordance with examples of embodiments described herein can involve one or more processors. Such embodiments can include embedded memory, input output interface, and various other circuitries as known in the art. Memory can comprise a volatile memory device, and/or a non-volatile memory device. A storage device can include non-volatile memory and/or volatile memory, including, but not limited to, EEPROM, ROM, PROM, RAM, DRAM, SRAM, flash, magnetic disk drive, and/or optical disk drive. The storage device can include an internal storage device, an attached storage device, and/or a network accessible storage device, as non-limiting examples.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this document are not necessarily all referring to the same embodiment.

Additionally, this document may refer to "obtaining" various pieces of information. Obtaining the information can include one or more of, for example, determining the information, estimating the information, calculating the information, predicting the information, or retrieving the information from memory.

Further, this document may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this document may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", "one or more of", and "at least one of", for example, in the cases of "A/B", "A and/or B", "one or more of A or B" and "at least one of A and B", is intended to encompass the selection of the first listed option (A) only, or the selection of the second listed option (B) only, or the selection of both options (A and B). As a further example, in the cases of "A, B, and/or C", "one or more of A, B or C", and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for refinement. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream or signal of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

Various generalized as well as particularized embodiments are also supported and contemplated throughout this disclosure.

What is claimed:

1. An apparatus for providing a user interface to present adjacently listed services indicating video content, the apparatus comprising:
   one or more processors configured to:
   receive a first list of a plurality of services indicating video content, wherein each of the services of the first list has a channel number and an associated video format being a combination of a video transfer function and a video resolution;
   reorganize an order of the first list, based on the associated video format of each service, to generate a second list by grouping together services having same combinations of video transfer function and video resolution; and
   present a user interface using the second list, wherein the user interface allows switching from any one service to an adjacent service in the second list.

2. The apparatus of claim 1, wherein the second list reduces instances of latency when sequentially switching between adjacent services in the second list compared to switching between adjacent services arranged in a numeric order by channel number.

3. The apparatus of claim 1, wherein the second list reduces instances of latency by reducing a likelihood of a reconfiguration of a video pipeline when switching from processing content provided by a first service to processing content provided by a second service adjacent to the first service.

4. The apparatus of claim 1, wherein the user interface using the second list comprises an electronic program guide wherein a channel number indicates a video content service.

5. The apparatus of claim 1, wherein an order of the second list reduces a transition time by reducing an expected time to acquire an I-frame of an adjacent service in the second list.

6. The apparatus of claim 1, wherein the user interface using the second list enables a channel surfing sequence by a user repeatedly activating one or more of a channel-up command and a channel-down command of a remote control for any of a television, a television signal receiver, a set-top box, a gateway device, a mobile device, a cell phone, or a tablet computer.

7. The apparatus of claim 1, wherein grouping together services having same combinations of video transfer function and video resolution is further based on one or more user preferences.

8. The apparatus of claim 7, wherein the one or more user preferences correspond to user selection of program content available in one video format rather than user selection of program content available in a different video format.

9. The apparatus of claim 1, wherein the one or more processors reorganize the order of the first list further based on any of:
 reducing an occurrence of a video format parameter change associated with a transition from one service to an adjacent service that causes a greatest latency;
 a prioritization by a user of any of content and services into two or more tiers of favorites; or
 placement in the second list of a wrap-around point at which advancing through a sequence of adjacent services past an end of an electronic program guide moves the sequence of adjacent services to a beginning of the electronic program guide.

10. A method for presenting adjacently listed services indicating video content, the method comprising:
 receiving a first list of a plurality of services indicating video content, wherein each of the services has a channel number and an associated video format being a combination of a video transfer function and a video resolution;
 reorganizing an order of the first list, based on the associated video format of each service, to generate a second list by grouping together services having same combinations of video transfer function and video resolution; and
 presenting a user interface using the second list, wherein the user interface allows switching from any one service to an adjacent service in the second list.

11. The method of claim 10, wherein reorganizing the order of the first list to generate the second list reduces instances of latency when sequentially switching between adjacent services in the second list compared to switching between adjacent services arranged in numeric order by channel number.

12. The method of claim 10, wherein the second list reduces instances of latency by reducing a likelihood of a reconfiguration of a video pipeline when switching from processing content provided by a first service to processing content provided by a second service adjacent to the first service.

13. The method of claim 10, wherein presenting the user interface using the second list comprises presenting an electronic program guide using the second list.

14. The method of claim 10, wherein grouping together services having same combinations of video transfer function and video resolution is further based on one or more user preferences.

15. The method of claim 14, wherein the one or more user preferences correspond to user selection of program content available in one video format rather than user selection of program content available in a different video format.

16. The method of claim 10, wherein reorganizing the order of the first list to generate the second list produces an order of the second list that reduces an expected time to acquire an I-frame of an adjacent service in the second list.

17. The method of claim 10, wherein presenting a user interface using the second list enables a channel surfing sequence by a user repeatedly activating one or more of a channel-up command and a channel-down command of a remote control for any of a television, a television signal receiver, a set-top box, a gateway device, a mobile device, a cell phone, or a tablet computer.

18. A non-transitory computer-readable medium comprising instructions, which when executed by a processor, perform a method comprising:
 receiving a first list of a plurality of services indicating video content, wherein each of the services has a channel number and an associated video format being a combination of a video transfer function and a video resolution;
 reorganizing an order of the first list, based on the associated video format of each service, to generate a second list by grouping together services having same combinations of video transfer function and video resolution; and
 presenting a user interface using the second list, wherein the user interface allows switching from any one service to an adjacent service in the second list.

19. The non-transitory computer-readable medium of claim 18, wherein presenting a user interface using the second list comprises presenting an electronic program guide using the second list.

20. The non-transitory computer-readable medium of claim 18, wherein grouping together services having same combinations of video transfer function and video resolution is further based on one or more user preferences that correspond to user selection of program content available in one video format rather than user selection of program content available in a different video format.

* * * * *